United States Patent [19]

Sotani et al.

[11] Patent Number: 4,896,716
[45] Date of Patent: Jan. 30, 1990

[54] HEAT PIPE TYPE HEAT-EXCHANGER FOR THE VENTILATION

[75] Inventors: Junji Sotani; Chiyoshi Sasaki, both of Yokohama, Japan

[73] Assignee: The Furukawa Electric Co., Ltd., Tokyo, Japan

[21] Appl. No.: 309,970

[22] Filed: Feb. 13, 1989

Related U.S. Application Data

[63] Continuation of Ser. No. 148,537, Jan. 26, 1988, abandoned.

[30] Foreign Application Priority Data

Jan. 27, 1987 [JP] Japan ............................ 62-10493[U]

[51] Int. Cl.⁴ .......................... F24H 3/02; F28D 15/00
[52] U.S. Cl. ................................ 165/54; 165/104.14; 165/76
[58] Field of Search ....................... 165/54, 104.14, 76

[56] References Cited

U.S. PATENT DOCUMENTS 3,788,388  1/1974  Barkmann ...................... 165/104.14
4,742,864  5/1988  Duell et al. ........................ 165/47

FOREIGN PATENT DOCUMENTS 0175791  10/1983  Japan ..................................... 165/54
0259849  12/1985  Japan ..................................... 165/54

OTHER PUBLICATIONS

William A. Shurcliffe, "Air-to-Air Heat Exchangers for Houses", Copyright 1982, Chapter 21, pp. 125-128.
Sydney Reiter, "Industrial and Commercial Heat Recovery Systems", Copyright 1983, Chapter 4.6, pp. 57-60.
Catalogue distributed by Furukawa Electric Co., Ltd. (no date).

Primary Examiner—John Ford
Attorney, Agent, or Firm—Armstrong, Nikaido, Marmelstein, Kubovcik & Murray

[57] ABSTRACT

A heat pipe type heat-exchanger for ventilation is disclosed, having a plurality of heat pipes affixed with widely spaced fins provided internally in a box like case and arranged horizontally relative to the case, a partition plate dividing the inside of the case into two chambers on the right and left is provided crossing the heat pipes, an inlet and an outlet are formed for the respective chambers of the case, and fans for circulating the air to the respective chambers in opposite directions through the inlets and outlets are provided to make one chamber always an air-supplying chamber and other chamber always an air-discharging chamber. The connection point of power source wires of the fan motors is placed in the air-supplying chamber.

3 Claims, 2 Drawing Sheets

HEAT PIPE TYPE HEAT-EXCHANGER FOR THE VENTILATION

This application is a continuation of application Ser. No. 148,537 filed Jan. 26, 1988, now abandoned.

BACKGROUND OF THE INVENTION

The present invention relates to the improvement in a heat pipe type heat-exchanger for ventilation, with which the exchanging work of connection ducts etc. for air-supply and air-discharge would be eliminated, even if the open air may be at any temperature to that inside the chamber to be ventilated.

The heat exchanger according to the invention is suitable as a ventilation device for the cultivation of mushrooms, in particular, making the exchange of connection ducts unnecessary in summer and in winter.

The prior art of heat-exchangers for ventilation will be explained taking the air-conditioned cultivating chamber for mushrooms as an example.

The important matters for the environment in the cultivating chamber for mushrooms are to lower the concentration of carbon dioxide gas and to maintain the chamber temperature constantly through the year. For these reasons, in the cultivating chamber for mushrooms, the heat-exchanger for ventilation is installed in many cases from a viewpoint of energy conservation. However, since the humidity is extremely high in the cultivating chamber for mushrooms, a large quantity of moisture adheres to elements of the heat-exchanger when discharging the air in the chamber and further, since the spores of mushroom floating in the chamber adhere to this deposit, the stabilized use for a long term becomes impossible, if the space between elements is small as in the case of the usual whole heat-exchanger.

The inconvenience as described above has been overcome by using the heat pipe type heat-exchanger in which the space between elements is widened to some extent. In this conventional heat pipe type heat-exchanger, a plurality of heat pipes are disposed vertically relative to the case and, connected with fins made of aluminum alloy, they are fitted in the case.

The inside of said case is divided into two chambers at the top and bottom. A fan is provided for the respective chambers and the side plates of the case are cut open in the direction of the flow passages of air by fans mounted in the structure. Moreover, since it is more efficient to allow the working fluid to move in a way that it evaporates at one end of the heat pipe in the lower chamber of the case and condenses at other end of the heat pipe in the upper chamber, the air is discharged through the lower chamber and supplied through the upper chamber to exchange the heat in winter when the air temperature is lower in the open air than in the cultivating chamber. Inversely, in summer when the air temperature is higher in the open air than in the cultivating chamber, the air is supplied through the lower chamber and discharged through the upper chamber to exchange the heat. For this reason, the power source wires are connected so that the rotating direction of the fans is reversed in summer and in winter, and the air-discharging and air-supplying ducts are reversed.

The conventional heat pipe type heat-exchanger for ventilation aforementioned is generally fitted to the side wall of the cultivating chamber for mushrooms and, in order to raise the efficiency of supply and discharge of air, ducts are usually connected. The method of connecting ducts is as follows:

In winter, as shown in FIG. 3, one opening of the outdoor air supplying duct (d') is connected to the upper chamber (12) of the heat-exchanger (4') and the other opening is left open extending upward. Also, one opening of the indoor air-supplying duct (b') is connected similarly to the upper chamber (12) and the other opening extends sideways so as to be open to the upper portion of the cultivating chamber, so as to supply the air uniformly to the chamber. Next, one opening of the indoor air-discharging duct (a') is connected to the lower chamber (13) of heat-exchanger (4') and the other opening is open to the lower portion of the cultivating chamber in order to discharge carbon dioxide gas stagnating at the bottom of the cultivating chamber. Further, one opening of the outdoor air-discharging duct (c') is connected similarly to the lower chamber (13) and the other opening is left open extending downward to separate it from the opening of the outdoor air supplying duct (d').

Further, is summer, since the movement of supply and discharge of air in the top and bottom chambers of the heat pipe type heat-exchanger for ventilation reverses from that in winter, the alteration of the connection of power source wires in necessary to reverse the rotation of each fan and the connection of ducts for air-supply and air-discharge to the heat-exchanger must be exchanged between the top and bottom chambers, resulting in the inconvenience of handling.

Moreover, since the power source wires of two fan motors of such heat-exchanger are usually connected to the external power source wire inside the heat-exchanger, they are exposed to the atmosphere of high humidity in either season of summer and winter. This can cause an accidental short circuit. Furthermore, since the reversing changeover switch of the fan motors is generally placed in the environment of high humidity, a short circuit here is also apt to occur.

As a result of extensive investigations in view of this situation, the inventors have known that, since the working fluid moves in either direction of right and left in equal efficiency if using the heat pipe installed horizontally relative to the case, it is immaterial which end of the heat pipe may be made the evaporation section (or the condensation section). And, in consequence of further investigations, a heat pipe type heat-exchanger for ventilation has been developed according to the invention, wherein the rotating direction of fans is made constant whatever the temperature of the open air may be, for example, through the seasons of summer and winter and yet the exchange of ducts is unnecessary.

SUMMARY OF THE INVENTION

The invention relates to a heat pipe type heat-exchanger for ventilation characterized in that a plurality of heat pipes fixed with widely spaced fins are provided internally in a box-like case horizontally relative to the case, a partition plate dividing the inside of the case into two chambers on the right and left is provided crossing the heat pipes, an inlet and an outlet are formed for the respective chambers of the case, and fans for circulating the air to respective chambers in opposite directions through the inlets and outlets are provided to make one chamber an air-supplying chamber and other chamber an air-discharging chamber.

DETAILED DESCRIPTION OF THE INVENTION

The heat pipe operates in a manner such that one end exposed to the air of higher temperature always becomes the evaporation sections, the working fluid within the heat pipe absorbs the heat at said evaporation section to evaporate and moves to the other end of lower temperature (condensation section) where it releases the heat to condense, and the condensed working fluid returns to the evaporation section. The reason why the heat pipes are installed horizontally in the heat-exchanger for ventilation according to the invention is that, since the working fluid can move equally well in either direction, the direction of movement of the working fluid does not matter and the heat can be transferred with the same efficiency whichever end may become higher in temperature (or lower in temperature). Namely, by installing the heat pipes horizontally, the direction of rotation of the fans fitted in each of the right and left chambers accommodating respectively the ends of the heat pipe in the heat-exchanger can remain fixed, to make one chamber always the air-supplying side and the other chamber always the air-discharging side. By means of this, the heat-exchanger for ventilation according to the invention acts such that the end on the air-supplying side of the heat pipe becomes automatically the evaporation section and other end on the air-discharging side becomes condensation section in the case when the air temperature is higher in the open air than in the cultivation chamber (for example, in summer), whereas the end on the air-discharging side of the heat pipe becomes the evaporation section and other end on the air-supplying side becomes the condensation section in the case when the air temperature is higher in the cultivation chamber than in the open air (for example, in winter).

Moreover, the connection point of the power source wires of fan motors of heat-exchanger for ventilation according to the invention is preferable to be placed at a position through which the open air passes, that is, in the chamber on the fresh air intake side. The reason is that the wire connections are made so as not to contact the atmosphere having high humidity in the heat-exchanger chamber through which the discharged air passes, so as to prevent a short circuit.

PREFERRED EMBODIMENT

Figure 1:
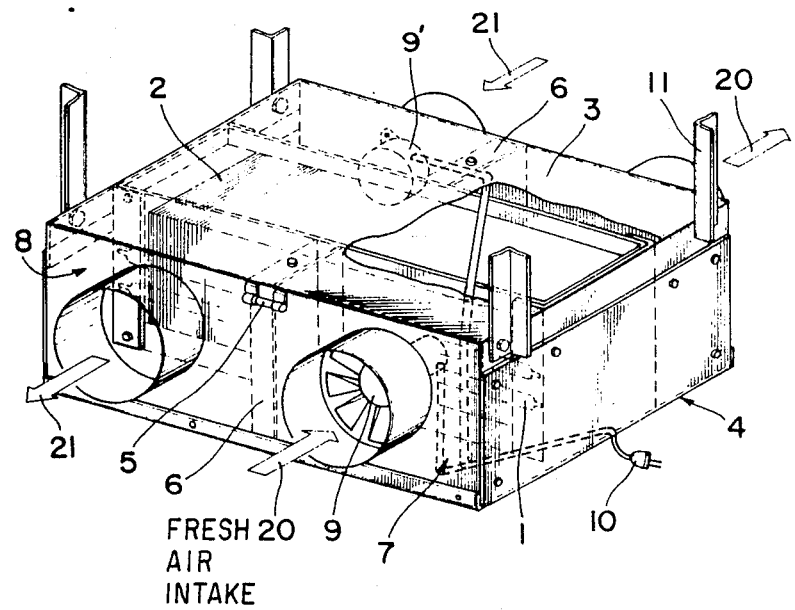
FIG. 1 is a perspective view showing one example of the invention.

One embodiment of the invention is shown in FIG. 1.

Fourteen heat pipes (1) with an outer diameter of 15.88 mm and a length of 445 mm in which Freon was sealed as a working fluid were affixed with aluminum fins (2) with a thickness of 0.15 mm disposed at a spacing pitch of 2.7 mm and this was installed in a case (3) horizontally relative to the case. In order to fit this heat-exchanger (4) accurately horizontally when fitting in a cultivating chamber for mushrooms, a bubble level vial (5) was provided on the outer face of case (3). Inside the case (3), an intermediate partition plate (6) was provided in the middle of the longitudinal direction of heat pipes (1) and in a direction perpendicular to said longitudinal direction to divide the case 3 into an air-supplying chamber (7) and an air-discharging chamber (8). Further, in the respective chamber (7) and (8), the opposed side walls in a direction perpendicular to the heat pipes (1) were cut open and suction fans (9) and (9') with an airflow rate of 330 m$^3$/hr were fitted on the inlet side of air for the respective chambers (7) and (8). Moreover, the power source wires of the fans (9) and (9'), as shown in the diagram, are connected to external power source wire (10) inside the fresh air-supplying chamber (7).

Figure 2:
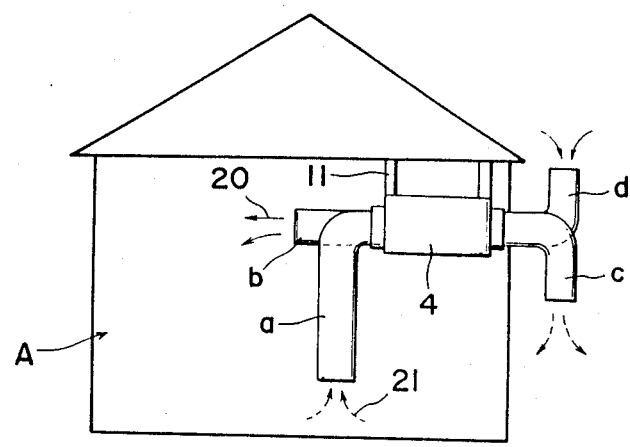
FIG. 2 is an illustration showing the application of the heat-exchanger for ventilation according to the invention.
Figure 3:
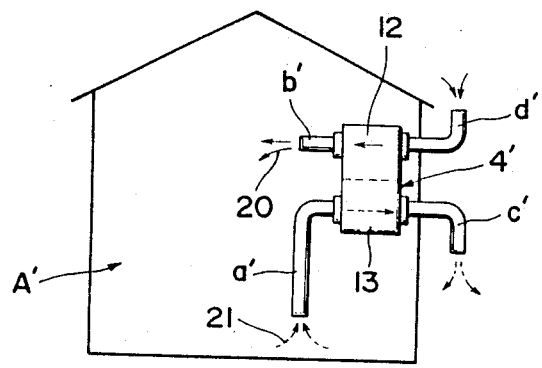
FIG. 3 is an illustration showing the example of a prior art heat-exchanger for ventilation.

Next, one example showing the connection state of ducts when the heat-exchanger is installed in the cultivating chamber is shown in FIG. 2. Heat-exchanger (4) is fixed to the ceiling of a mushroom cultivating chamber (A) by a suspension device (11). The indoor air-discharging duct (a) is extended downwardly for the opening to reach to the lower portion of the cultivating chamber (A) and the indoor air-supplying duct (b) is fitted horizontally. Also, the opening of the outdoor air-discharging duct (c) is directed downwardly outside the chamber and that of the outdoor air-supplying duct (d) is directed upwardly outside the chamber. As a result, in running for two years the heat-exchanger for ventilation according to the invention installed in this manner has functioned excellently.

Besides, due to the characteristics as described above, the heat-exchanger for ventilation according to the invention is especially suitable as a ventilation device for the cultivation of mushrooms. However, the use is not confined to this purpose, and it can also be used as a ventilation device aimed at energy conservation for a gardening greenhouse, bath house, restaurant, general house, etc.

As described, in accordance with the invention, practical and remarkable effects can be obtained with the ventilation devices aiming at energy conservation in that the work to exchange the ducts using for the heat-exchanger for ventilation and the changing-over of the rotating direction of fans for air-supply and air-discharge are unnecessary, even if the open air may be at any temperature (for example, in summer and in winter), and the occurrence of a short circuit can be reduced by placing the connection point of power source wires of the fan motors in the air-supplying chamber.

What is claimed is:

1. A heat pipe type heat-exchanger ventilation unit for a humid environment comprising:
    a generally box-like case having sides forming a substantially enclosed space;
    a plurality of heat pipes affixed with fins provided internally of said case, said heat pipes extending horizontally and being fixedly positioned vertically one above another extending across said enclosed space;
    a partition plate within said case extending transversely across said heat pipes so as to divide the enclosed space into two side-by-side closed chambers;
    an air inlet and an air outlet formed in each of said chambers, in opposite sides of said case, each side having an inlet to one chamber and an outlet from the other chamber; and
    a pair of fans affixed in said case, including a fan affixed in each of said inlets, for circulation of air through the respective chambers; said unit further including an external power source wire extending into one of said chambers used to intake air of low humidity, power connections of said fans to said external power source wire beng made in said one of said chambers.

2. A heat pipe type heat exchanger ventilation unit as recited in claim 1, wherein said fins are affixed to said heat pipes at a spacing pitch of substantially 2.7 mm.

3. A heat pipe type heat exchanger ventilation unit as recited in claim 1, further comprising a bubble level affixed to said case so as to indicate horizontal position of said heat pipes.

* * * * *